(12) United States Patent
Page

(10) Patent No.: US 8,884,790 B2
(45) Date of Patent: Nov. 11, 2014

(54) MATRIX KEYBOARDING SYSTEM

(75) Inventor: John Dennis Page, Guyton, GA (US)

(73) Assignee: Twitch Technologies LLC, Guyton, GA (US)

(*) Notice: Subject to any disclaimer, the term of this patent is extended or adjusted under 35 U.S.C. 154(b) by 828 days.

(21) Appl. No.: 13/040,083

(22) Filed: Mar. 3, 2011

(65) Prior Publication Data

US 2011/0215954 A1  Sep. 8, 2011

Related U.S. Application Data

(60) Provisional application No. 61/310,110, filed on Mar. 3, 2010.

(51) Int. Cl.
| | |
|---|---|
| H03K 17/94 | (2006.01) |
| H03M 11/00 | (2006.01) |
| G06F 3/02 | (2006.01) |
| G09G 5/00 | (2006.01) |
| G06F 3/0488 | (2013.01) |
| G06F 3/023 | (2006.01) |

(52) U.S. Cl.
CPC .......... G06F 3/0235 (2013.01); G06F 3/04886 (2013.01)
USPC ................. 341/22; 341/20; 341/23; 345/168; 200/5 A; 178/17 C; 379/433.07

(58) Field of Classification Search
None
See application file for complete search history.

(56) References Cited

U.S. PATENT DOCUMENTS

| | | |
|---|---|---|
| 2,031,017 A | 2/1936 | Tevis |
| 3,428,747 A | 2/1969 | Alferieff |
| 3,507,376 A * | 4/1970 | Kafafian ........................ 400/87 |

(Continued)

FOREIGN PATENT DOCUMENTS

| | | |
|---|---|---|
| EP | 0 134 160 | 3/1985 |
| WO | WO 83/03909 | 11/1983 |
| WO | WO 88/00137 | 1/1988 |
| WO | WO 2004/023281 | 3/2004 |

OTHER PUBLICATIONS

Lewis, James R. et al., "Keys and Keyboards", Handbook of Human-Computer Interaction, 2nd Edition, Chapter 54, Aug. 1997, Elsevier Science B.V., pp. 1285-1315.

(Continued)

*Primary Examiner* — Mohammad Ghayour
*Assistant Examiner* — Jerold Murphy
(74) *Attorney, Agent, or Firm* — Nixon & Vanderhye P.C.

(57) ABSTRACT

A data input system and method utilize a keyboard including a first keypad having at least five keys and a second keypad having at least five keys. With the at least ten keys of the first and second keypads, at least twenty-five two-key combinations including one key from each of the first and second keypads are established, where the two-key combinations each represent characters. Additionally, at least twenty chord combinations including multiple keys from the first keypad and multiple keys from the second keypad are established, where the chord combinations each represent special characters and commands. A matrix of characters may be selected, and one of the two-key combinations corresponding to a selected one of the characters in the selected matrix of characters is activated to effect input of the character; or one of the chord combinations corresponding to a selected special character or a selected command is activated to effect input of the selected special character or activation of the selected command, respectively. The activations are repeated until data entry is complete.

20 Claims, 9 Drawing Sheets

(56) References Cited

U.S. PATENT DOCUMENTS

| | | | |
|---|---|---|---|
| 4,067,431 A | | 1/1978 | Whitaker |
| 4,333,097 A | | 6/1982 | Buric et al. |
| 4,414,537 A | | 11/1983 | Grimes |
| 4,655,621 A | | 4/1987 | Holden |
| 4,679,030 A | | 7/1987 | Volnak |
| 4,791,408 A | * | 12/1988 | Heusinkveld ................... 700/84 |
| 4,905,001 A | | 2/1990 | Penner |
| 5,017,030 A | | 5/1991 | Crews |
| 5,281,966 A | | 1/1994 | Walsh |
| 5,410,333 A | | 4/1995 | Conway |
| 5,515,305 A | | 5/1996 | Register et al. |
| 5,642,108 A | * | 6/1997 | Gopher et al. ................... 341/22 |
| D381,017 S | | 7/1997 | Burrell, IV |
| 5,828,323 A | * | 10/1998 | Bartet ............................. 341/22 |
| 5,993,089 A | | 11/1999 | Burrell, IV |
| 6,297,752 B1 | | 10/2001 | Ni |
| 7,667,692 B2 | | 2/2010 | Marcus et al. |
| 7,724,157 B1 | * | 5/2010 | Gray ................................ 341/22 |
| 7,800,592 B2 | * | 9/2010 | Kerr et al. ..................... 345/173 |
| 2002/0118176 A1 | | 8/2002 | Ribak |
| 2003/0184452 A1 | | 10/2003 | Goodgoll |
| 2007/0103454 A1 | | 5/2007 | Elias |
| 2009/0006941 A1 | | 1/2009 | Yoshida |

OTHER PUBLICATIONS

Lewis, James R. et al., "Development of a Digram-Based Typing Key Layout for Single-Finger/Stylus Input", Proceedings of the Human Factors and Ergonomics Society $43^{rd}$ Annual Meeting, vol. 54, 1999, Human Factors and Ergonomics Society, Santa Monica, pp. 415-419.

* cited by examiner

MAIN CHARACTER MAP
THUMBS + INDEX FINGERS

SEND/ENTER
(DEPENDING UPON MODE)
INDEX + MIDDLE FINGERS

NUMBER MODE
INDEX + RING FINGERS

AUXILARY CHARACTER MAP
(CUSTOMIZABLE)
RING + PINKIE FINGERS

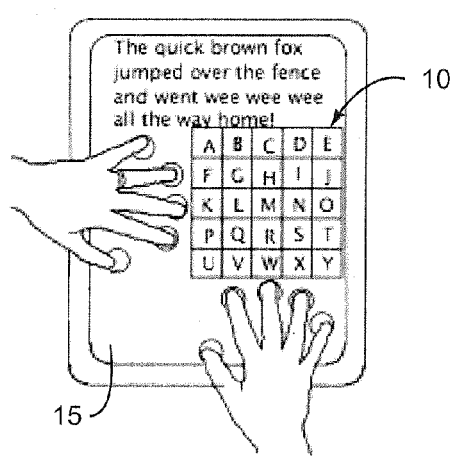
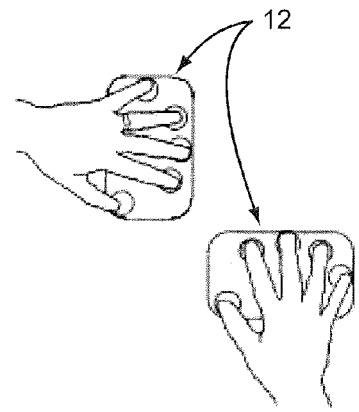
FIG. 16  FIG. 17
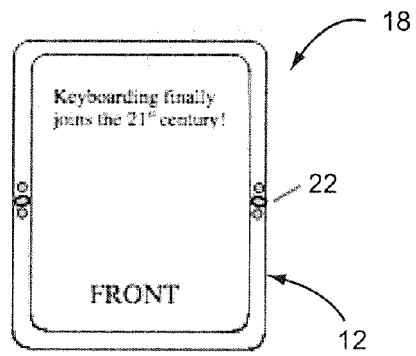
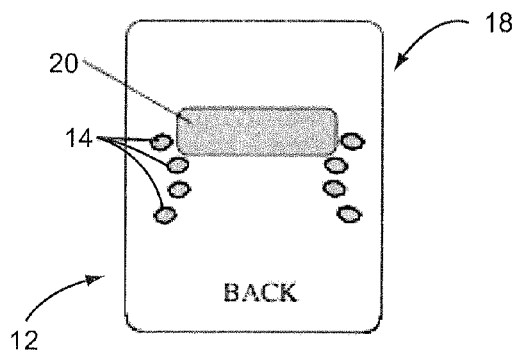
FIG. 18  FIG. 19
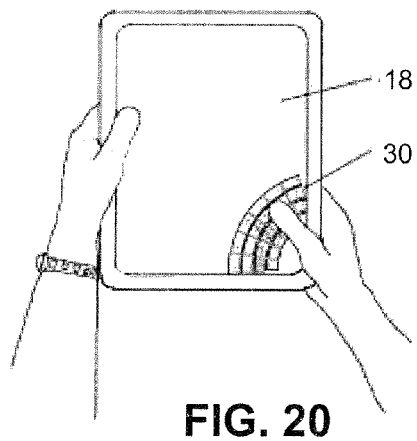
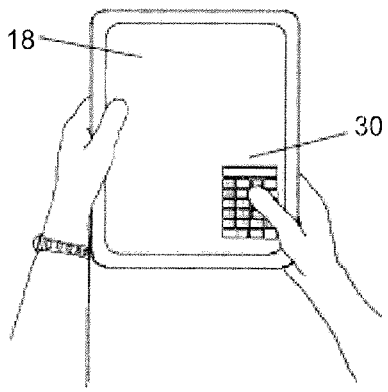
FIG. 20  FIG. 21

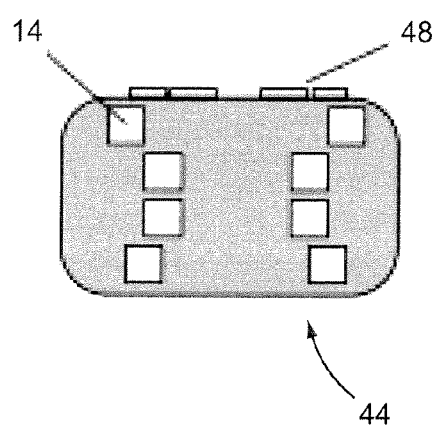
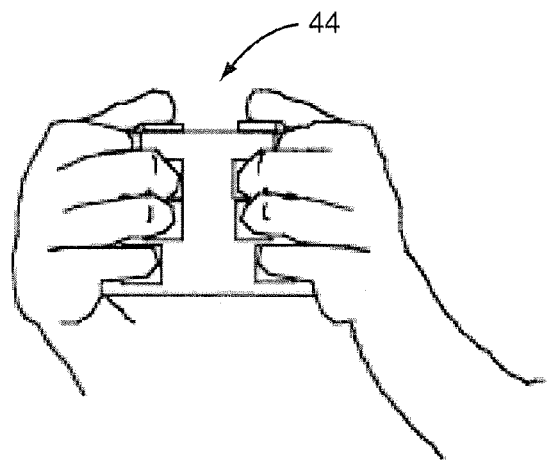
FIG. 27      FIG. 28
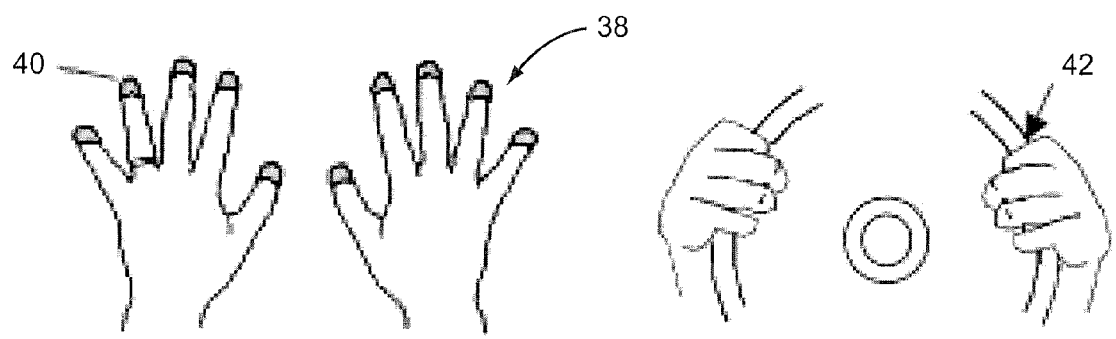
FIG. 29      FIG. 30

MATRIX KEYBOARDING SYSTEM

CROSS-REFERENCES TO RELATED APPLICATIONS

This application claims the benefit of U.S. Provisional Patent Application Ser. No. 61/310,110, filed Mar. 3, 2010, the entire content of which is herein incorporated by reference.

STATEMENT REGARDING FEDERALLY SPONSORED RESEARCH OR DEVELOPMENT (NOT APPLICABLE)

BACKGROUND OF THE INVENTION

This invention pertains generally to electronic data entry devices and, more specifically to keyboard data entry devices. The invention pertains to a new kind of alphanumeric keyboard and a novel system for manually inputting alphanumeric information into data processing equipment such as computers, PDA's, cell phones, and other devices, which, in some embodiments, may send and receive text messages.

As computers continue to evolve into ever-smaller devices such as PDA's, advanced mobile phones, and tablet computers, users still find themselves bound to unwieldy keyboards for data entry. Users generally either have to choose between full-sized keyboards, which negate the main purpose for having a small computer, or they must settle for tiny, hard to use, inefficient keyboards. Until now, there have been several attempts at making smaller sized, efficient data entry devices, but each have had their own limitations.

For decades, the holy grail of data input was considered to be speech recognition, but even with speech recognition technology maturing, there still remain a host of issues that render it less than ideal for most applications. Many attempts have been made to develop effective alternative input devices. These approaches have included gloves that incorporate touch sensors, keyboards that split apart, touch screens, and even virtual keyboards, projected by laser. Attempts at producing one and two-handed combinational keyboards have also been made. Until now, none of these approaches has proven effective or practical.

The advent of portable, touch screen tablet computers and other mobile computer devices makes possible a new class of ergonomic keyboard designs that can exploit a new system of data entry called MATS (Matrix Typing System).

BRIEF SUMMARY OF THE INVENTION

This invention allows data entry keys to be placed in an ergonomic manner so that when the computer device is being held like a book, the user's fingertips will naturally rest on the appropriate keys. The user is thus able to "type" or efficiently input keyboard data without moving their hands from a natural, comfortable position. Because the fingers continually rest upon the keys, it is also possible, with the help of an actuator, to provide key data back to the fingers.

This invention provides a novel and efficient method of manual data input (also referred to as typing), by exploiting the attributes of modern handheld computer devices, including those devices that are tablet styled. This invention further provides a number of unique products that take advantage of this new method of data input.

In an exemplary embodiment, a method of effecting data input uses a keyboard including a first keypad having at least five keys and a second keypad having at least five keys. The method includes the steps of (a) with the at least ten keys of the first and second keypads, establishing at least twenty-five two-key combinations including one key from each of the first and second keypads, the two-key combinations each representing characters; (b) establishing at least twenty chord combinations including multiple keys from the first keypad and multiple keys from the second keypad, the chord combinations representing special characters and commands; (c) selecting a matrix of characters; (d) activating one of the two-key combinations corresponding to a selected one of the characters in the selected matrix of characters to effect input of the character or activating one of the chord combinations corresponding to a selected special character or a selected command to effect input of the selected special character or activation of the selected command, respectively; and (e) repeating steps (c) and (d) until data entry is complete.

The keypads may be arranged to define a 5×5 matrix of the twenty-five two-key combinations. Step may be practiced by activating one of the chord combinations. In one embodiment, step (c) is practiced by selecting a number mode by activating one of the chord combinations, wherein in the number mode, each of the at least ten keys corresponds to a number from 0 to 9. Step (c) may also be practiced by selecting from a plurality of character matrices.

In one arrangement, the data is input to a tablet-style computer or to a smartphone, where step (a) is practiced by arranging some of the keys of the first and second keypads on a back side of the tablet-style computer or the smartphone and by arranging at least one of the keys of each of the first and second keypads on a front side of the tablet-style computer or on a side surface of the smartphone. In this context, the keys on the back side of the tablet-style computer or the smartphone may be positioned in locations corresponding to a natural finger placement while holding the tablet-style computer or the smartphone, and the keys on the front side of the tablet-style computer or on the side surface of the smartphone may be positioned in locations corresponding to a natural thumb placement while holding the tablet-style computer or the smartphone, respectively.

Step (d) is preferably practiced by pressing the keys corresponding to the one of the two-key combinations. Alternatively, step (d) may be practiced by making contact with particular locations of a touch-sensitive surface. As yet another alternative, step (d) may be practiced by detecting at least one of movement and pressure in particular locations.

The first keypad and the second keypad may be separate and independent units.

The first keypad and the second keypad may each consist of five keys.

In another exemplary embodiment, a keyboard data input system is operatively coupleable with a device and includes a processor and a display. The keyboard data input system includes a first set of at least five keys positioned for operation by an operator's left hand, and a second set of at least five keys positioned for operation by the operator's right hand. The first set of keys and the second set of keys define at least twenty-five two-key combinations including one key from each of the first and second sets of keys, where the two-key combinations each represent characters. The first set of keys and the second set of keys further define at least twenty chord combinations including multiple keys from the first set of keys and multiple keys from the second set of keys, where the chord combinations represent special characters and commands. A selection unit cooperable with the first and second sets of keys enables a selection of a matrix of characters. One of the two-key combinations corresponding to a character in the selected matrix of characters is activated to effect input of the character; or one of the chord combinations corresponding to a selected special character or a selected command is activated to effect input of the selected special character or activation of the selected command, respectively.

Preferably, the selection unit comprises one of the chord combinations, where the matrix of characters is selected according to an activation or a non-activation of the one of the chord combinations.

In one arrangement, the device is a tablet-style computer or a smartphone, where some of the keys of the first and second sets of keys are positioned on a back side of the tablet-style computer or the smartphone, and at least one of the keys of each of the first and second sets of keys is positioned on a front side of the tablet-style computer or on a side surface of the smartphone. In this context, the keys on the back side of the tablet-style computer or the smartphone are positioned in locations corresponding to a natural finger placement while holding the tablet-style computer or the smartphone, and the keys on the front side of the tablet-style computer and on the side surface of the smartphone are positioned in locations corresponding to a natural thumb placement while holding the tablet-style computer or the smartphone, respectively. The data input system may additionally include a touch-sensitive input surface on the back side of the tablet-style computer, where the touch-sensitive input surface is positioned within finger reach of the keys on the back side of the tablet-style computer.

In another arrangement, a connector secures the keyboard data input system to the device, where the keyboard data input system communicates with the device via the connector or wirelessly.

Each of the keys may include an actuator and a key cap, where the keys are activated by depressing the key cap, and where the actuator is effective to output data to the operator by displacing the key caps according to a signal from the device.

In yet another exemplary embodiment, a computer apparatus including a processor and a keyboard data input system includes a first keypad consisting of five keys, the keys of the first keypad being operatively coupled with the processor, and a second keypad consisting of five keys, the keys of the second keypad being operatively coupled with the processor. The keys of the first and second keypads are arranged to define twenty-five two-key combinations including one key from each of the first and second keypads and twenty chord combinations including multiple keys from the first keypad and multiple keys from the second keypad. Activation or non-activation of one of the chord combinations effects access to a plurality of character sets.

BRIEF DESCRIPTION OF THE DRAWINGS

These and other aspects and advantages of the invention will be described with reference to the accompanying drawings, in which:

FIG. 16 illustrates MATS typing on a touch-screen;

FIG. 17 shows an embodiment with keypads separated from the character matrix;

FIG. 18 shows the front of a touch-screen computer with built-in thumb keys;

FIG. 19 is a rear view of a MATS-enabled tablet style computer;

FIG. 20 shows an arc styled punctuation character set;

FIG. 21 shows a calculator character set;

FIG. 27 shows an exemplary keyboard layout of a MATS-enabled device;

FIG. 28 shows usage of a MATS-enabled handheld device;

FIG. 29 shows an embodiment of MATS using finger tip sensors;

FIG. 30 shows an embodiment of MATS integrated into a vehicle steering wheel;

DETAILED DESCRIPTION OF THE INVENTION

Figure 1:
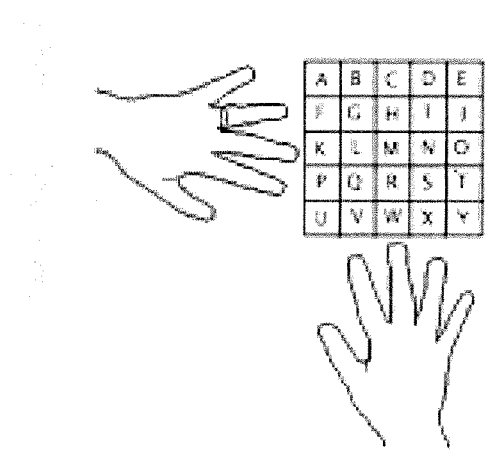
FIG. 1 shows the basic matrix typing system (MATS) layout.
Figure 2:
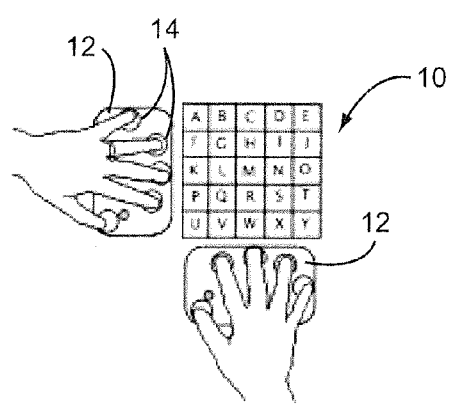
FIG. 2 shows the basic character matrix with a possible keypad embodiment.

With reference to the drawings, the system uniquely exploits the correlation between first twenty-five letters of the alphabet placed sequentially within a 5×5 matrix 10, and the five fingers of the left and right hands. In this system, five keys correspond and are aligned with each of the five rows of the character matrix 10, and five keys correspond and are aligned with each of the five columns. See FIG. 1. With reference to FIG. 2, the data input system preferably includes two keypads 12 with ten primary keys 14. The keys 14 can be hardware keys, virtual keys, touch-screen emulations of keys, etc. In a preferred arrangement for learning, the keys 14 are configured such that five keys are positioned on one side of the matrix 10 in a manner that each key is associated and aligned with a specific row of the matrix 10, and a corresponding keypad including the other five keys 14 is placed below the matrix 10 so that each key is associated and aligned with a specific column in the matrix 10. The five fingers of both the operator's hands are placed on the keys 14 of each of the respective keypads 12. The operator can select characters from the character matrix 10 by simultaneously pressing the appropriate column key with a finger of one hand and the appropriate row key with a finger of the other hand.

In a computer implementation, input of the character matrix is effected via keypads 12 including individual buttons/switches 14 for each finger of each hand. The communication and cooperable operation between the keypads 12 and the computer system may be any suitable construction similar to known user interface configurations for existing systems. The details thereof will thus not be further described.

Figure 3:
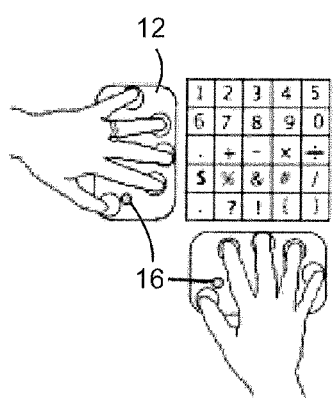
FIG. 3 shows an alternative character matrix including a shift key.
Figure 4:
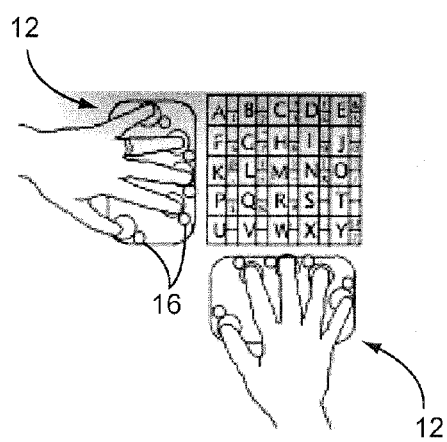
FIG. 4 shows an enhanced character matrix with multiple shift keys.

With reference to FIGS. 3 and 4, in addition to the buttons 14 on each keypad 12, the keypads may additionally include one or more shift keys 16 to effect entry of alternative characters including, for example, lower case letters, numbers, symbols, etc.

Of course, the character matrix 10 may be expanded by adding additional rows and columns. In this context, each keypad 12 may include corresponding additional keys 14 for each of the additional rows and columns. The additional keys 14 are preferably positioned within reach of a hand "resting" position in which the user's five fingers of each hand are positioned on five corresponding "home" keys 14. Additionally or alternatively, each cell within the matrix may contain more than one character. Alternate characters may be selected via alternate keys or shift keys 16 located in the vicinity of each of the primary column and row keys 14. The shift keys 16 may be used to access a full alternate character set via a shift option or the like, activated by a single key or by other means such as a combination of keys. When an alternate matrix of characters is selected via the shift key 16 or the like, a corresponding change will occur on the display. Additionally, an audible alert may be issued to note the change.

As an alternative to the shift key 16 for accessing alternative characters, other means for accessing alternative characters may include the force or speed of a key strike. For example, a harder/faster key strike may cause a normally lower-case character to become capitalized. Alternatively, a harder/faster key strike could cause some other predetermined action to take place.

The keyboard data input system may be further configured to be responsive to "gestures" or chords, where the simultaneous touching of two or more keys on the same keypad (as opposed to simultaneous touching of keys on opposing keypads) can create a new action, a new mode, a new character matrix, etc. For example, the simultaneous key strike by the index and middle finger on one keypad may select a period, whereas the simultaneous key strike by those same fingers on the opposite keypad may act as a "space bar" command. Gestures may also include simultaneous touching of multiple keys on both keypads. Likewise, special preset characters may be assigned to individual keys so that simply "typing" that key will yield the desired character.

In a preferred arrangement, the system is capable of utilizing various chords or gestures to effect predefined output. It has been discovered that utilizing two-finger chords are most effective. It is easier for a new user to understand and implement two-finger chords than more complex chords. From a technical standpoint, working with anything beyond two-finger chords may be problematic, because the processor interpreting keystrokes has no way of knowing whether the user intends to do a two-finger chord, or if it should wait around for an additional keystroke to occur for a more complex chord. Two simultaneous keystrokes, however, are easy to interpret. When a single key is depressed, the processor simply waits for the next key to be struck.

Multi-finger gestures (i.e., beyond two-finger chords) may also be viable in limited combinations. For example, in certain cases, multi-finger gestures (e.g., simultaneously holding down the three middle fingers on both hands) may place the keyboard into a new mode, such as the "number mode."

Figure 5:
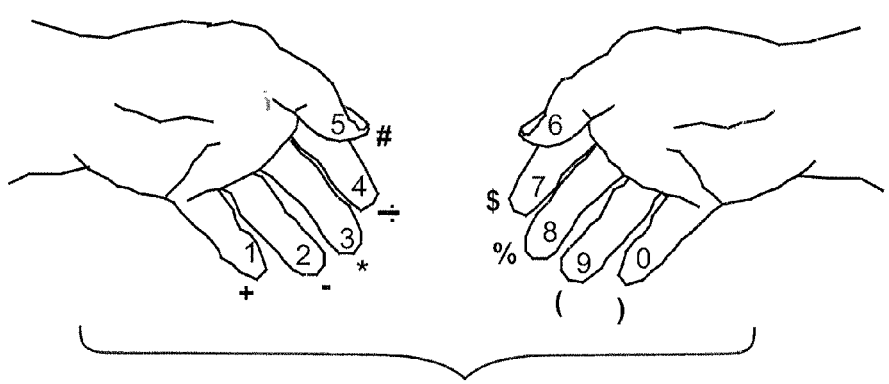
FIG. 5 shows key mappings for a number mode.
Figure 6:
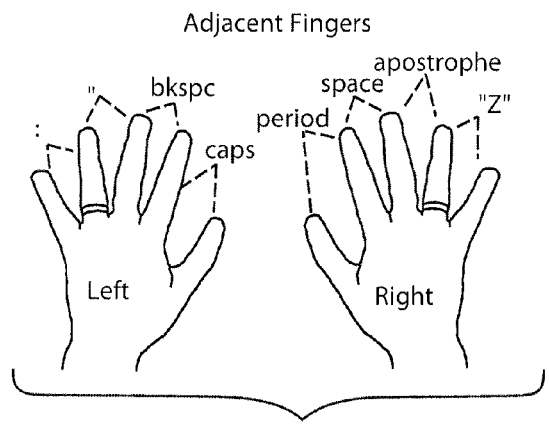
FIGS. 6-9 show exemplary single hand chords.
Figure 7:
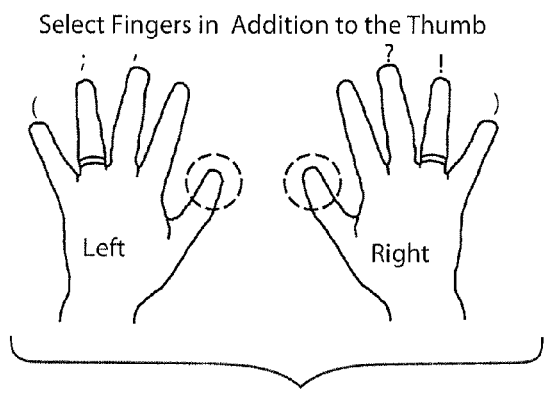
Figure 8:
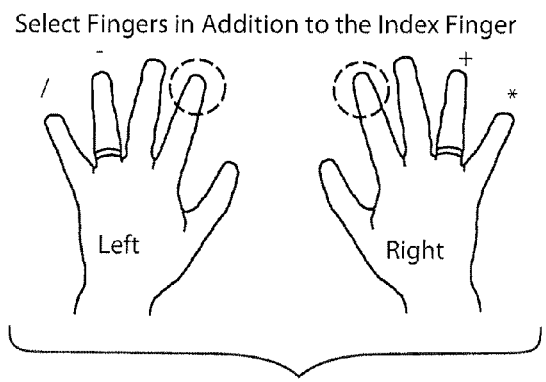
Figure 9:
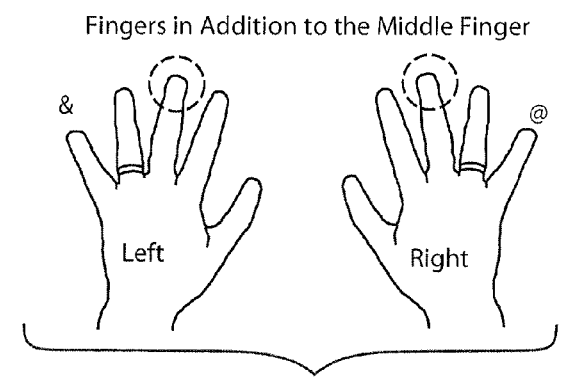
Figure 10:
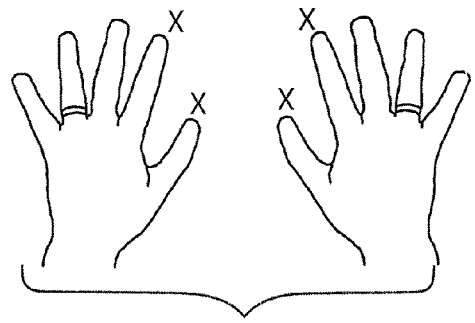
FIGS. 10-13 show exemplary mode change command chords.
Figure 11:
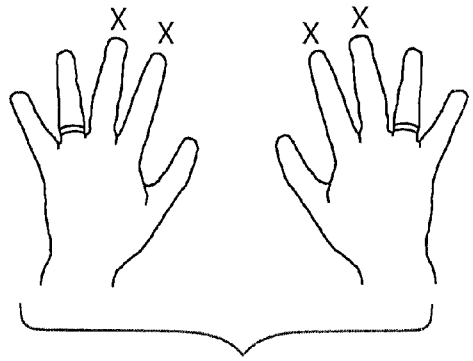
Figure 12:
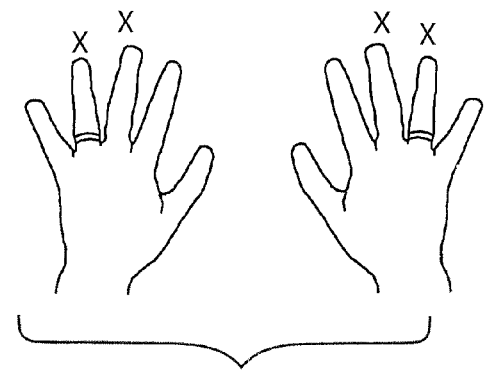
Figure 13:
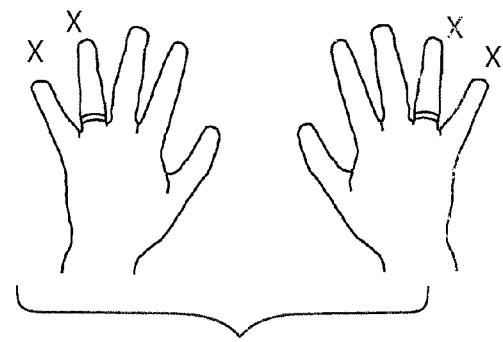

The chords may also enable texting without the use of the auxiliary thumb keys. Apart from the twenty-five characters available on a simple 5×5 matrix, there are ten additional characters available with two-finger combinations within each hand, for a total of 45 characters possible with two-finger gestures on 10 keys. This of course is expandable if a new matrix or mode is called up, via gestures or the like designed to go into such a mode. For instance, simultaneous selection of four fingers on the left hand may hypothetically be used to call up a whole new character matrix. For example, with reference to FIG. 5, a number mode may be entered for single finger entry. In the tablet embodiment (discussed with reference to FIGS. 18 and 19 below), the mode may be activated by the simultaneous selection of the two bottom auxiliary thumb keys 22, or by some other prescribed gesture. A similar chord may be used for a PDA or smartphone version. When in the number mode, each finger will represent a specific number as shown. Depressing a shift key will allow indicated mathematical symbols to be accessed. Alternatively, while in the number mode, mathematical symbols may also be selected by prescribed two-finger chords.

FIGS. 6-9 show exemplary chord mappings for two- and multi-finger chords. These key mappings (including the matrix) can work regardless of the device. The device may be in the form of a single plane (flat) keyboard, or on a tablet where the fingers are under the tablet and the thumbs are on top, or on a steering wheel as it is normally held while driving, or even on a weapon with one hand near the trigger, and the hand other on the forestock. It should be easily understood that the ability to place keys on any hand-held device so that the keys are easily accessible to the fingers creates a host of potential applications including gaming controllers, vending machines, ATMs, etc. Other applications may be contemplated, and the invention is not meant to be limited to the described exemplary applications.

The mappings essentially provide full keyboard functionality for devices with only ten keys (many smaller devices may not necessarily have the real estate to offer room beyond that number). Those of ordinary skill in the art will recognize that these mappings are given merely as examples. Other mappings may generate alternative outputs, such as emoticons, complete phrases, and the like, or computer actions, such as "sending" a text message (for example, sending a text message may require the simultaneous holding down the ring finger and index finger of both hands for one second, which would help to prevent accidental sending) or mode changes (see FIGS. 10-13). Just as there could be alternate matrices, there could be multiple mappings of the same hand chords.

Table 1 below is a summary of the exemplary mappings:

| Left Hand Characters | Finger Formula | Right Hand Characters |
| --- | --- | --- |
| CAPS | Thumb + Index | Period |
| Back Space | Index + Middle | Space |
| Quotation mark | Middle + Ring | Apostrophe |
| Colon | Ring + Pinkie | "Z" |
| Comma | Thumb + Middle | Question mark |
| Semi-colon | Thumb + Ring | Exclamation point |
| Open parenthesis ( | Thumb + Pinkie | Close parenthesis ) |
| Dash (minus sign) – | Index + Ring | Plus sign + |
| Slash (division sign) / | Index + Pinkie | Asterisk (multiplication sign) * |
| Ampersand "&" | Middle + Pinkie | @ |

Figure 14:
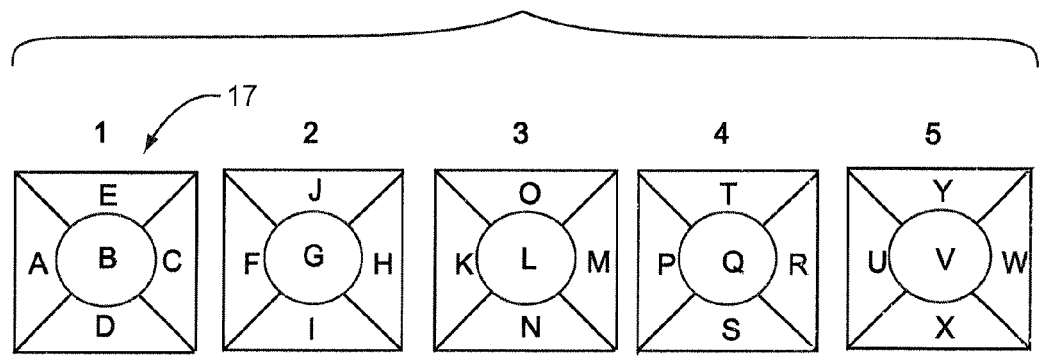
FIGS. 14 and 15 show an application of how the alphabet may be input utilizing a 5-position joystick.
Figure 15:
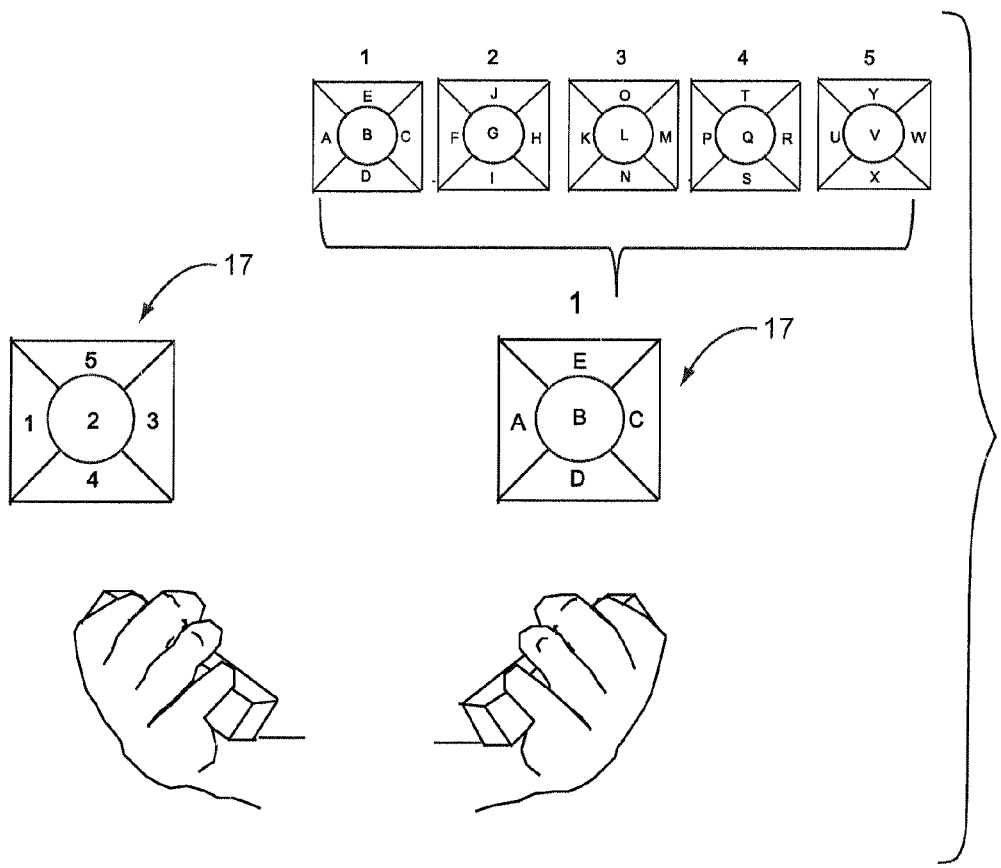
Figure 35:
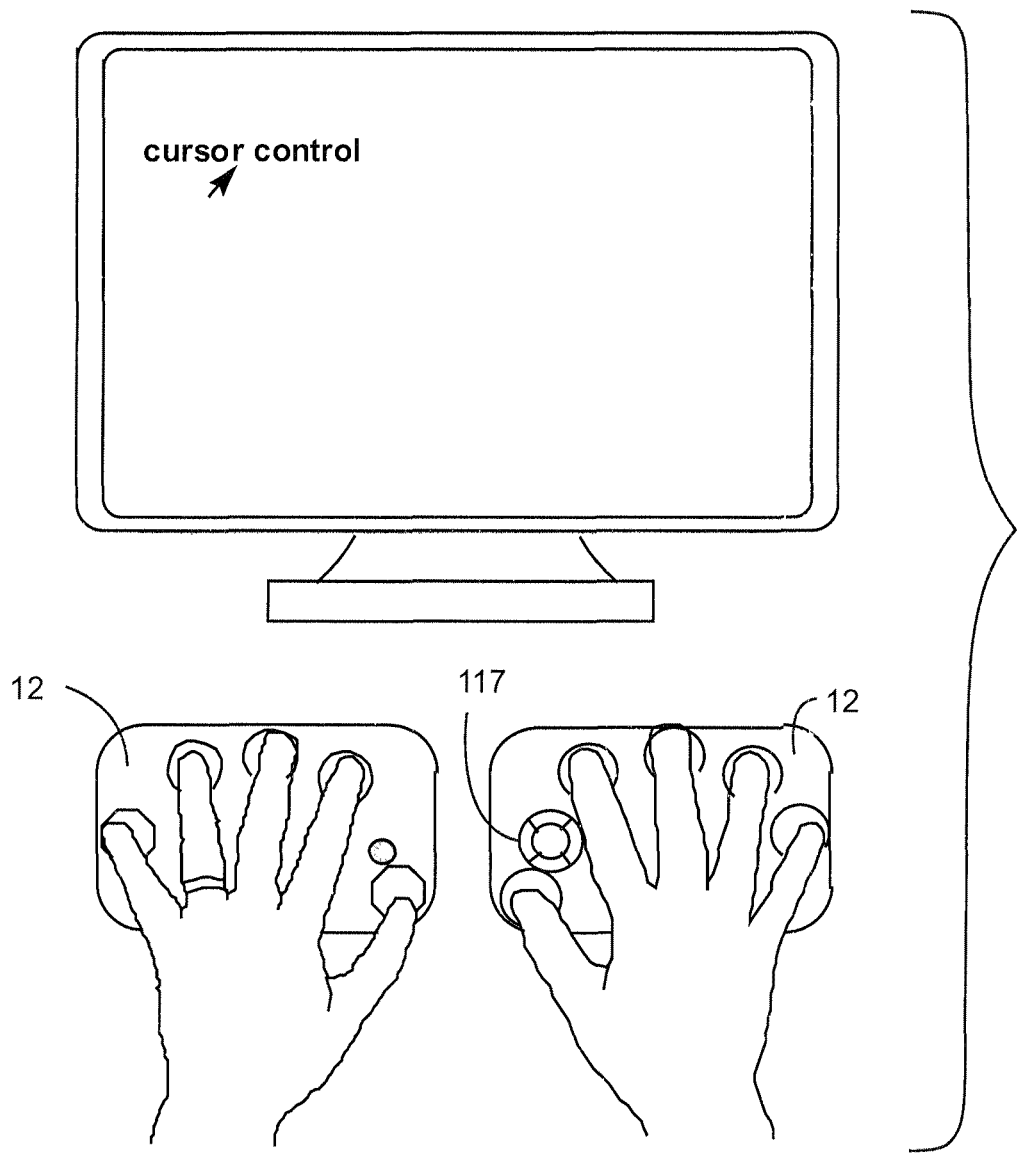
FIG. 35 shows one of the keyboards including a navigation joystick.

With reference to FIGS. 14 and 15, if the user is working with a screen, then a small 5-position thumb controlled joystick 17 could be utilized for one of the thumb keys. Cursor control is via the four buttons on the periphery: left, right, up, down. The middle section could operate as a normal or enter button. Fingers are positioned over keys so typing can occur with just one hand. A single left hand key could be used in combination with a single right hand key, so that the left hand key selects one of five character maps, and the right hand key selects the position on the character map to be input. Just two thumbs (or fingers) would provide convenient access to twenty-five letters of the alphabet, with applications in gaming and texting. An accessory key of the same type can greatly expand the utility (fill in the missing links: punctuation, etc.). A related joystick 117 may comprise an added input key, in addition to the standard ten keys. See FIG. 35. The joystick 117 may be used for navigation.

In the context of the matrix application using separate keypads 12 and keys 14 for each finger, the interface can come in any form or construction, including, for example, traditional hardware style data entry keys, the touch-screen for data entry, a projected keyboard or other virtual keyboard for receiving keystroke data, a motion sensor that can detect the finger motion as a "virtual" key press, etc. and/or combinations thereof.

As shown in FIG. 16, the character matrix 10 may be displayed with the corresponding keypad to facilitate learning of the matrix data entry system. In one embodiment, when used with a display 15, the selection of the key corresponding to the desired row or column causes the full column or row to be visually highlighted. The particular "cell" defined by the inner section of the selected row and column is also caused to be specially illuminated or visually differentiated from the remainder of the characters. In a tablet computer or the like, the touch-screen system can become a "touch typing" training tool for learning the character matrix. The user is able to type directly onto the display screen, and once having learned the matrix, the user is instinctively able to operate more efficient hardware versions of the keypad, including those that may be built directly into the host device, attached to the host device or may operate independent of the host device. In some arrangements, the character matrix 10 can be removed from the keypads to effect a more compact keyboard system. See FIG. 17.

FIGS. 18 and 19 show an exemplary tablet style computer 18 with the matrix keypads 12 integrated into the hardware. In this context, the keypads and components are physically attached to the host system components, such as the CPU and the display, so the system is able to receive power from the host system and communicate directly with the host system. Alternatively, the keypads and components may be located remotely from the other system components, where power and data communications with the host device may be provided via wired or wireless connections. In still another alternative, the keypad system is built as a separate unit that may clip on, slip on as a case, or otherwise attach to and communicate with a device such as an advanced phone, tablet computer, PDA, ebook or other communication device or computer (discussed in more detail below with reference to FIG. 22). The keypads 12 may take the form of an egg, a sphere, a bar or any other object that would be comfortable to hold by hand and be a suitable platform for mounting of appropriate keys.

The front of the tablet computer 18 is shown in FIG. 18, and the back of the computer 18 is shown in FIG. 19. The keyboard input system includes a plurality of keys 14 for the user's fingers on the backside of the computer 18. A touch pad 20 may also be provided for cursor control. On the front side of the computer 18, one or more thumb keys 22 are provided. As shown, three thumb keys 22 may be provided for each of a user's thumbs in order to add increased functionality. With the tablet computer 18 held in the hands as a book or a pad would be held, the data input keys 14, 22 and touch pad 20 are located in a position convenient to the normal placement of the fingers, typically with thumbs on the top side and the remainder of fingers underneath. The keys 14 may be recessed ergonomically into the body of the device 18, positioned convenient to the normal placement of the fingertips. The touch pad 20 can be easily accessed by one or more of the user's fingers while holding the device 18 in a normal manner.

As an alternative to the use of keys 14, 22, a sensor sensing capacitance or the like may sense the location and movement of the user's fingers so that the device can immediately receive input data from the fingers regardless of their position. Motion-type sensors may also be used. In a similar context, 3M, a company located in St. Paul, Minn., has developed a new, hi-res touch screen film that is flexible and is multi-touch capable. This film could potentially wrap around to the back side of a hand held or tablet-style computer. The material can sense up to twenty simultaneous finger inputs. In theory, a user could simply hold such a device in their hands, and the finger positions could be determined by the device, so that the user could just type using the MATS input methodology without requiring specific positions for the user's fingers.

The keypads 12 may contain an inertial or other internal reference system so that movement of the keypad results in a corresponding "mouse" movement on a display device. The keypads may integrate a mouse or joystick controller for control of the display and may include provisions for "selecting" or "clicking" items in the display. In certain embodiments, individual keys may also function as a mouse pad or joystick so that they may control a variety of actions, including, for example, cursor control.

With reference to FIGS. 20 and 21, the data input system can enable special character sets 30 to appear on a hand-held touch-screen display, such as on a tablet computer 18. As shown, the character set 30 is preferably oriented in a manner to make it easily accessible by the user's thumb and may be selected by the touch of a thumb or other finger. In FIG. 20, the character set 30 is for punctuation and is displayed in an arc orientation. Another example is shown in FIG. 21, showing a calculator that is displayed graphically consistent with traditional calculators and where numbers and functions are selected by touching the characters with a single thumb or other finger. In a similar context, the user may be able to customize the selectable characters within a matrix, and in the case of a touch-screen system, the user can customize the matrix by dragging and dropping characters, etc. into the matrix. Consistent with the operation of tablet computers and other touch-screen devices, the user can reposition the location of the customized character set on the display by dragging or the like.

Figure 22:
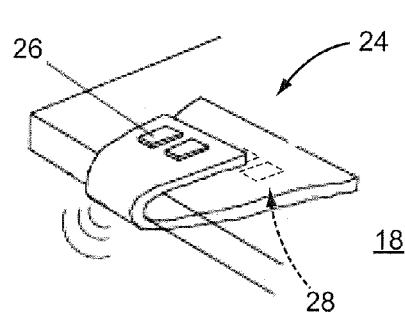
FIG. 22 shows an embodiment of a clamp-on wireless MATS keypad.

With reference to FIG. 22, in an alternative embodiment, the keyboard data input system may take the form of a U-shaped configuration 24, or other suitable shape that can attach to an electronic device such as a tablet computer 18. In one construction, each keypad 24 includes at least five keys 14, with at least one thumb key 26 positioned on one side of the device (preferably the display side) and four finger keys 28 positioned on the opposite side of the device (preferably the back side). The unit 24 can be connected via a USB port or other hardware connection or may communicate with the device 18 wirelessly. As an alternative to the thumb keys 26, the thumb keys may be replaced by graphical or virtual buttons on the touch-screen.

Figure 23:
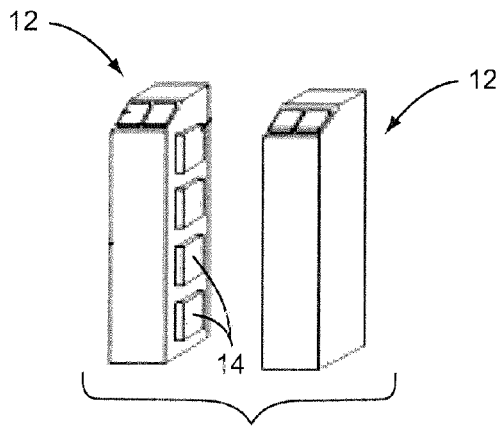
FIGS. 23-25 show an embodiment of handheld MATS.
Figure 24:
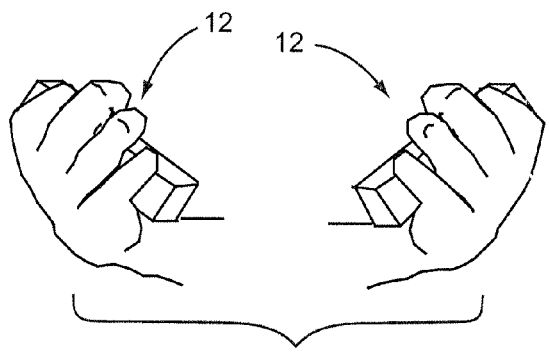
Figure 25:
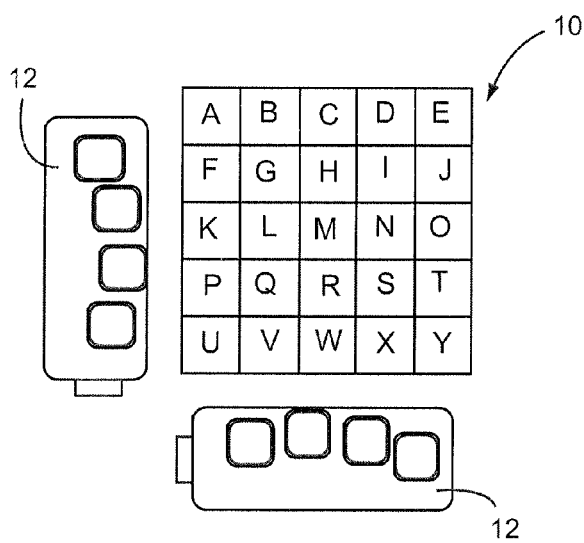

With reference to FIGS. 23-25, the keypads 12 may come in the form of separate and independent units easily gripped in the user's hands. Each unit similarly includes keys 14 that are placed for one-handed operation based on where the user's fingers will fall depending on the shape of the units. As shown in FIG. 25, there is a close relationship between the horizontal (flat) matrix and other platforms. Once the matrix data input concept is mastered, the user may easily transition to devices with other form factors and configurations.

Figure 26:
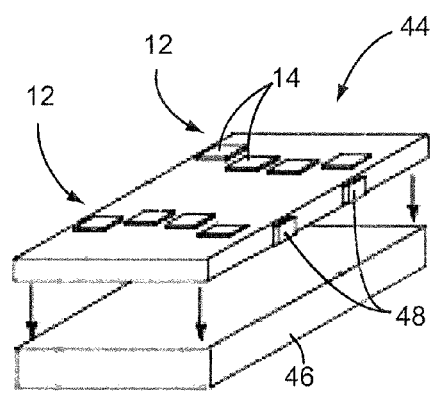
FIG. 26 shows an embodiment with an accessory device attachable to a hand-held device.

FIGS. 26-28 show an application of the keyboard input system to a smartphone, PDA or the like. In the configuration shown, the keyboard input system takes the form of an accessory 44 attachable to the device 46. The accessory include keypads 12 for a user's left and right hands including finger buttons 14 and separated thumb buttons 48. With the device held in a "landscape" orientation (see FIG. 28), the user's fingers and thumbs naturally rest on the respective keys of the keyboards. The accessory 44 communicates with the device 46 by any suitable means including, for example, a direct wired connection or by a wireless connection.

For hardware attachable to existing structure, power for the hardware can be provided in any suitable manner. For example, the device may be powered by rechargeable battery or via a direct connection to the host device with a USB connection or other port. The device can alternatively or additionally be powered by the electricity generated by the physical activity of pressing the keypad, whether by piezoelectric means or any other means. As still another alternative, power may be provided by induction from the host device or from an electromagnetic field created by the host device. Power may also be provided in the form of an RF transmission.

The device may include an accessory finger guide for small touch-screens that provides cutouts or indentations that allow the user to easily locate the proper finger positions. This same guide may function as a restraining device for the fingertips so that they are unable to come into contact with the touchscreen until a prescribed amount of pressure is exerted by the fingers, thus preventing premature data input.

With reference to FIG. 29, the key pads may take the form of gloves 38 including sensors 40 that enable data input by pressing the sensors 40 onto any hard surface. As an alternative to the gloves 38, the data input device may merely include small sensors that are placed as caps on the fingertips to effect data input by pressing the sensors 40 onto a hard surface.

FIG. 30 shows an embodiment utilizing a keyboard data input system integrated into the steering wheel 42 of a vehicle. The keys or sensors can be mounted or embedded in the steering wheel 42 for safe texting. With the above-noted 3M material incorporated into a steering wheel, the user could potentially have his finger positions recognized and would be able to use the steering wheel itself as a keyboard entry device.

Figure 31:
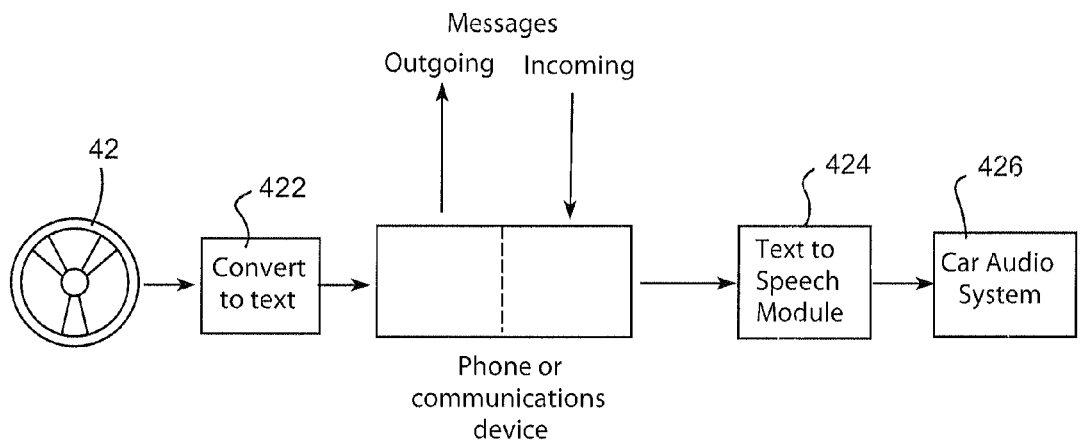
FIG. 31 shows a safe text communications system.
Figure 32:
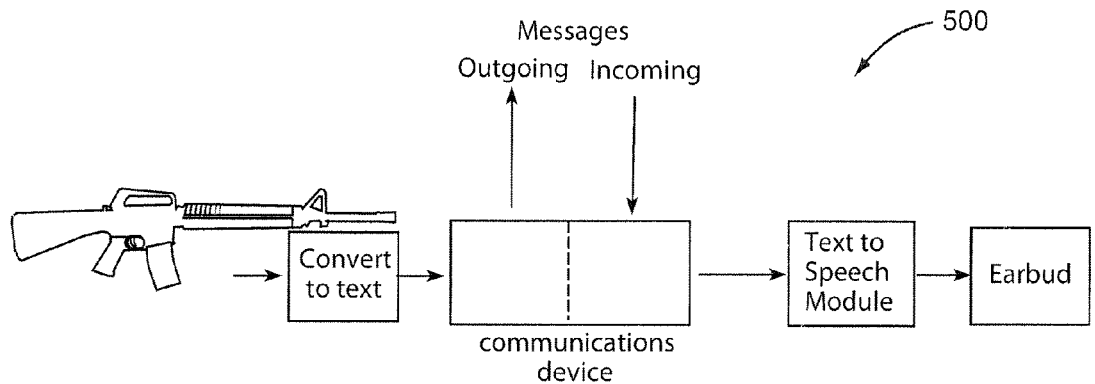
FIG. 32 shows an application to weapon embedded texting.
Figure 33:
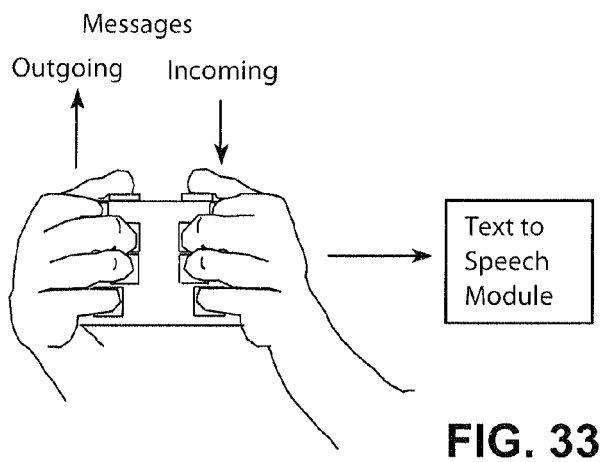
FIG. 33 shows a two-way communication scheme for visually or hearing impaired.

The safe texting system may additionally be viable by enabling safe transmission of data without looking down at a device. With reference to FIG. 31, upon data entry via the steering wheel 42, the data is converted by a component 422 of the system processor into data that is compatible with a cellular phone or other communications device. The data may be converted to speech, and in some variations, may be heard in the sender's own voice. Incoming text will come into the device, and then be converted into to speech via a processor component 424, which is then played audibly, preferably through the automobile's audio system 426. The text may be recalled in the user's own voice. This can be done via software, where a user speaks certain prescribed words, from which a portable voice file (pvf) is then created for each user. That way, texting friends can forward their voice file to each other so that when a text message is received, the smartphone or other device will read it out loud and in their own voice. Other applications of this concept are shown in FIGS. 32 and 33. FIG. 32 shows a weapon embedded texting system 500. The weapon is provided keyboard units that can send and receive data via a processor or the like. FIG. 33 shows a similar text to speech module, which also may be configured for hearing impaired via the use of an actuator key (described below with reference to FIG. 34). Other applications may include surveying instrumentation, medical office record keeping devices, delivery service provider tablets, vending machines, etc.

Figure 34:
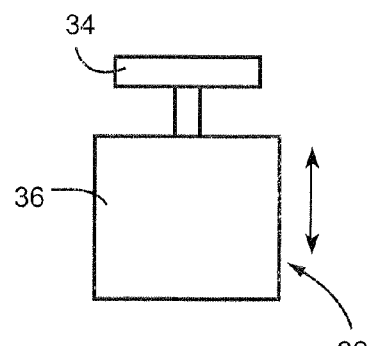
FIG. 34 illustrates a data key with bi-directional capability.

FIG. 34 shows an exemplary data key with bi-directional capability. The key includes a key cap 34 and an actuator 36. The key 32 is capable of both sending data information (as a normal keyboard key) and also by the actuator 36 to produce movement in the key cap 34, which the user can discern and interpret as character information. The key cap allows the user to "feel" incoming data through the user's fingers. This system makes possible two-way texting, which would be especially useful for the visually impaired.

The corresponding relationship of the fingers with the alphabetical matrix is the basis for the MATS keyboard system, and makes possible a variety of new products that can take advantage of the MATS system.

The advantages of the MATS system are many:
Keyboards can be infinitely portable
Keyboards can offer traditional keyboard tactile feel
Keyboards can be easily mastered, even by children
Rapid "typing" is possible due to fact that fingers remain over home keys
Inexpensive to implement
Works with real or virtual keys
Wired or wireless embodiments
Makes possible "safe" texting devices that can be used while driving
Built-in key actuators, make possible 2-way communication through the fingers.

The advent of portable touch-screen computers creates a perfect platform for the MATS system. The touch screen makes possible on-screen learning and training programs where the user can create customized character matrices and virtual keyboards. The ability of the row and column to be graphically highlighted with each keystroke helps make learning the matrix fun and easy. The touch-screen also provides a great platform for the creation of learning games, which can help improve MATS proficiency.

Once the touch-screen character matrix is learned, the user can then quickly transition to more advanced, "real key" MATS keypads, that can be built into the user's device or may be mounted as an accessory. The MATS keypads can be built ergonomically, so that it conforms to the natural contours of the user's hands, positioning the user's fingers directly over their respective keys. Optional wireless functionality allows the keypad to seamlessly communicate with the host device.

One of the major benefits from the MATS system is its ability to provide full keyboard functionality in a very compact size. In fact, MATS systems can even be built into gloves, steering wheels, or small devices that may be held in the palm of one's hands.

One application for MATS is as an accessory that may attach, or be built into a touch screen phone, or other small communications device. Also, because the MATS system allows the user's fingers to remain over the "home" keys, it is possible, with appropriate actuators, to send data back to the user, by moving or vibrating their fingers, so that the user can "hear" text or other information through their fingers.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of effecting data input with a keyboard including a first keypad having at least five keys and a second keypad having at least five keys, the method comprising:
   (a) with the at least ten keys of the first and second keypads, establishing at least twenty-five two-key combinations including one key from each of the first and second keypads, the two-key combinations each representing only letter characters;
   (b) establishing at least twenty chord combinations including multiple keys from the first keypad and multiple keys from the second keypad, the chord combinations representing only special characters and commands;
   (c) selecting a matrix of characters from a plurality of different matrices of characters;
   (d) activating one of the two-key combinations corresponding to a selected one of the characters in the selected matrix of characters to effect input of the character or activating one of the chord combinations corresponding to a selected special character or a selected command to effect input of the selected special character or activation of the selected command, respectively; and
   (e) repeating steps (c) and (d) until data entry is complete.

2. A method according to claim 1, wherein the keypads are arranged to define a 5×5 matrix of the twenty-five two-key combinations.

3. A method according to claim 1, wherein step (c) is practiced by activating one of the chord combinations.

4. A method according to claim 1, wherein step (c) is practiced by selecting a number mode by activating one of the chord combinations, and wherein in the number mode, each of the at least ten keys corresponds to a number from 0 to 9.

5. A method according to claim 1, wherein the data is input to a tablet-style computer or smartphone, the method further comprising arranging some of the keys of the first and second keypads on a back side of the tablet-style computer or the smartphone and arranging at least one of the keys of each of the first and second keypads on a front side of the tablet-style computer or on a side surface of the smartphone.

6. A method according to claim 5, wherein the keys on the back side of the tablet-style computer or the smartphone are positioned in locations corresponding to a natural finger placement while holding the tablet-style computer, and wherein the keys on the front side of the tablet-style computer and on the side surface of the smartphone are positioned in locations corresponding to a natural thumb placement while holding the tablet-style computer or the smartphone, respectively.

7. A method according to claim 1, wherein step (d) is practiced by pressing the keys corresponding to the one of the two-key combinations.

8. A method according to claim 1, wherein step (d) is practiced by making contact with particular locations of a touch-sensitive surface.

9. A method according to claim 1, wherein step (d) is practiced by detecting at least one of movement and pressure in particular locations.

10. A method according to claim 1, wherein the first keypad and the second keypad are separate and independent units.

11. A method according to claim 1, wherein the first keypad and the second keypad each consist of five keys.

12. A method according to claim 1, wherein the keyboard is a virtual keyboard, and wherein step (d) is practiced by detecting finger motion as a virtual key press.

13. A keyboard data input system operatively coupleable with a device including a processor and a display, the keyboard data input system comprising:
   a first set of at least five keys positioned for operation by an operator's left hand;
   a second set of at least five keys positioned for operation by the operator's right hand, wherein the first set of keys and the second set of keys define at least twenty-five two-key combinations including one key from each of the first and second sets of keys, the two-key combinations representing only letter characters, and wherein the first set of keys and the second set of keys further define at least twenty chord combinations including multiple keys from the first set of keys and multiple keys from the second set of keys, the chord combinations representing only special characters and commands; and
   a selection unit cooperable with the first and second sets of keys, the selection unit enabling a selection of a matrix of characters from a plurality of different matrices of characters,
   wherein one of the two-key combinations corresponding to a character in the selected matrix of characters is activated to effect input of the character or one of the chord combinations corresponding to a selected special character or a selected command is activated to effect input of the selected special character or activation of the selected command, respectively.

14. A keyboard data input system according to claim 13, wherein the selection unit comprises one of the chord combinations, and wherein the matrix of characters is selected according to an activation or a non-activation of the one of the chord combinations.

15. A keyboard data input system according to claim 13, wherein the device is a tablet-style computer or a smartphone, and wherein some of the keys of the first and second sets of keys are positioned on a back side of the tablet-style computer and the smartphone and at least one of the keys of each of the first and second sets of keys is positioned on a front side of the tablet-style computer or on a side surface of the smartphone.

16. A keyboard data input system according to claim 15, wherein the keys on the back side of the tablet-style computer or the smartphone are positioned in locations corresponding to a natural finger placement while holding the tablet-style computer or the smartphone, and wherein the keys on the front side of the tablet-style computer or on the side surface of the smartphone are positioned in locations corresponding to a natural thumb placement while holding the tablet-style computer or the smartphone, respectively.

17. A keyboard data input system according to claim 15, further comprising a touch-sensitive input surface on the back side of the tablet-style computer, the touch-sensitive input surface being positioned within finger reach of the keys on the back side of the tablet-style computer.

18. A keyboard data input system according to claim 13, further comprising a connector that secures the keyboard data input system to the device, wherein the keyboard data input system communicates with the device via the connector or wirelessly.

19. A keyboard data input system according to claim 13, wherein each of the keys comprises an actuator and a key cap, the keys being activated by depressing the key cap, wherein the actuator is effective to output data to the operator by displacing the key caps according to a signal from the device.

20. A computer apparatus including a processor and a keyboard data input system, the keyboard data input system comprising:
   a first keypad consisting of five keys, the keys of the first keypad being operatively coupled with the processor, each of the five keys being associated with a different finger on a user's right hand; and a second keypad consisting of five keys, the keys of the second keypad being operatively coupled with the processor, each of the five keys being associated with a different finger on the user's left hand, wherein the keys of the first and second keypads are arranged to define twenty-five two-key combinations including one key from each of the first and second keypads and twenty chord combinations including multiple keys from the first keypad and multiple keys from the second keypad, the twenty-five two-key combinations being visually associated with a 5×5 matrix and representing twenty-five letters of the English alphabet, wherein activation of one of the two-key combinations effects input of a corresponding one of the letters, and wherein activation or non-activation of one of the chord combinations effects access to a plurality of character sets.

* * * * *